United States Patent

[11] 3,587,860

[72] Inventors Herman E. Ries, Jr.
Chicago, Ill.;
Joseph Gabor, Hammond, Ind.
[21] Appl. No. 871,633
[22] Filed Nov. 7, 1969
[45] Patented June 28, 1971
[73] Assignee Standard Oil Company
Chicago, Ill.
Continuation of application Ser. No.
678,871, Oct. 30, 1967, now abandoned.

[54] METHOD AND APPARATUS FOR REMOVING
CONTAMINANTS FROM WATER
4 Claims, 2 Drawing Figs.
[52] U.S. Cl..................................................... 210/73,
210/322
[51] Int. Cl..................................................... B01d 21/00
[50] Field of Search............................................ 210/73,
252, 294, 320, 322, 179, 523, 525, (O. S. Digest)

[56] References Cited
UNITED STATES PATENTS
| 1,860,819 | 5/1932 | Schamberger | 210/523 |
| 2,470,418 | 5/1949 | Verner | 210/523 |
| 3,338,414 | 8/1967 | Lefke et al. | 210/179 |
| 3,358,838 | 12/1967 | Kosar et al. | 210/179 |

Primary Examiner—John Adee
Attorneys—Pike H. Sullivan, Arthur G. Gilkes and James F. Simons ABSTRACT: A plurality of counterrotating drums in series to remove materials floating on water and materials dispersed immediately below the surface of the water, a first drum partially immersed having a surface of organophilic material, the drum rotating in the direction of flow of the water removes heavy viscous contaminant materials. Another drum immersed more deeply and located downstream from the first drum has a hydrophilic surface material and the drum rotates against the flow of water to remove light oily contaminant material. Scraper means clean the contaminants from the surfaces of the drums and contaminant removal means remove the contaminants from the system.

PATENTED JUN 28 1971 3,587,860

INVENTORS.
Herman E. Ries, Jr.
Joseph Gabor
BY James F. Simons
ATTORNEY 3,587,860

METHOD AND APPARATUS FOR REMOVING CONTAMINANTS FROM WATER

This is a continuation of application Ser. No. 678,871, filed Oct. 30, 1967, now abandoned.

BACKGROUND OF THE INVENTION

For many years a considerable amount of research and development work has been performed on the removal of surface and colloidal contaminants from industrial waste water. The nature of surface and colloidal contaminants particularly in refinery effluent water and improved methods for contaminant removal from water have been problem areas for many years. Studies have included the consideration of thin-film transfer, mircroelectrophoresis of colloids, and the effects of zeta potentials.

The greater importance of water-pollution control and the large amount of attention given water containing oil and other contaminants by the public and by local and Federal Government authorities suggest the need for accelerated technological dvance in these large problematical areas.

The problem of waste disposal in the petroleum industry is quickly becoming very acute. Despite the many years of intensive research by those most highly skilled in the art, no simple inexpensive techniques have heretofore been developed which enable the production of an effluent water which is sufficiently free from oil and other obnoxious contaminants to meet the strict requirements of regulatory bodies. Accordingly, an object of this invention is to provide such a technique. Another object is to provide an improved method and means for effecting the removal of oil and other such contaminants from water by a simple, inexpensive apparatus and method. Another object of this invention is to maximize oil recovery simultaneously minimizing water pickup.

Patents including U.S. Pats. No. 3, 338, 414 and 2,948,677 exemplify the known state of the art and it is believed that none of the known art anticipates nor renders obvious Applicants' novel subject matter.

SUMMARY OF THE INVENTION

This invention concerns the separation and removal of oil and other like contaminants from water.

The novel apparatus includes in combination, a plurality of closed cylinders forming drums partially submerged in the fluid to be cleaned. The drums are rotatable about their longitudinal axes and the long axes of the drums are at right angles to the direction of flow of the water. The drums rotate in opposite directions. Each cylinder can be equipped with a contaminant removal means and a means for transporting the contaminant material from the system.

The plurality of rotatable drums partially immersed within the fluid to be cleaned can include a first drum having a surface of organophilic material, the drum rotating in the direction of flow of the fluid such as water containing oil and other like contaminants, and a second drum immersed more deeply than the first can be located downstream from said first drum, the second drum having a hydrophilic surface, the second drum rotating against the flow of water. The first drum functions to remove heavy viscous oils while the second drum functions to remove light oils. The surfaces of the drums are smooth and level in the direction of the longitudinal axes. The means for removing the contaminants from the surfaces of the rotating drums can be a Viton or similar type scraper means such as Teflon. The means for collecting and transporting the contaminant material from the system may be any type of means such as a vacuum motivated system. The cylinders may be rotated by any power means such as an electric motor or other types of prime movers directly or indirectly connected to the cylinders.

DESCRIPTION OF A PREFERRED EMBODIMENT

Figure 1:
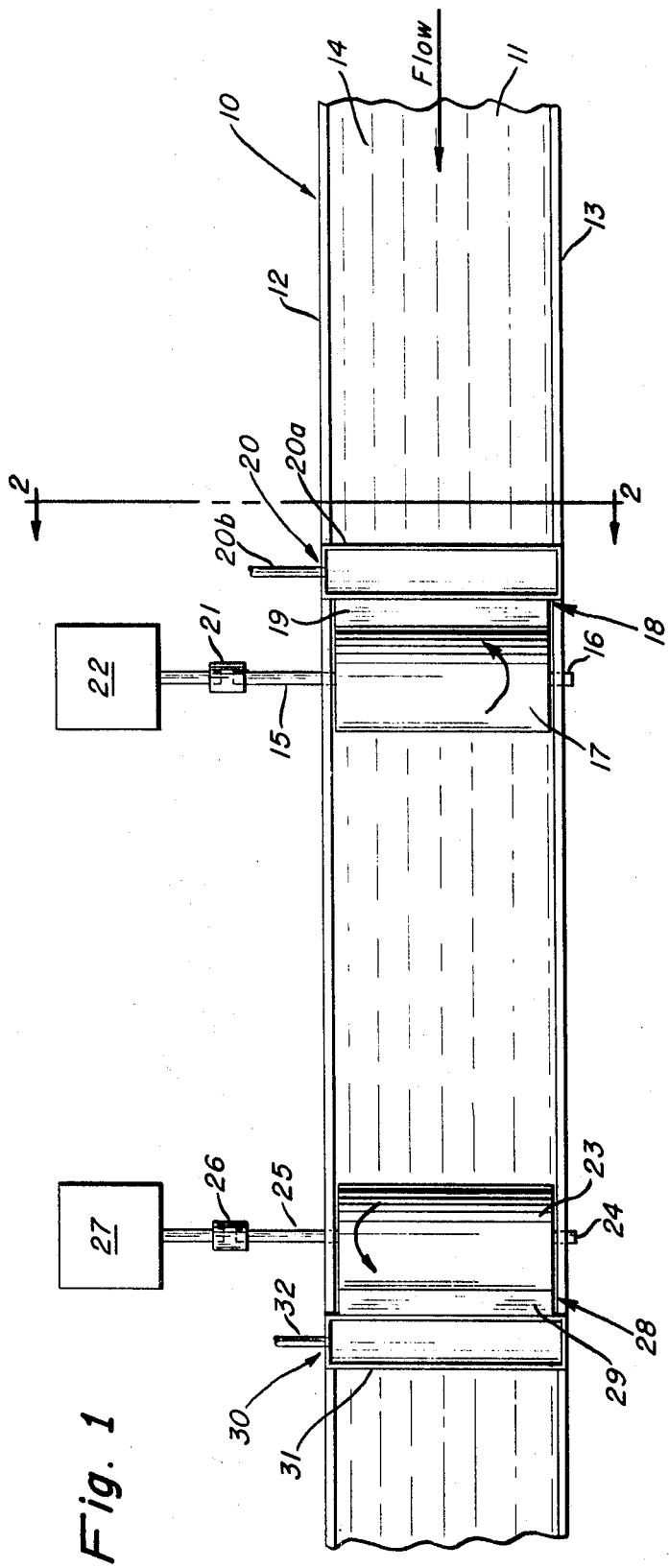
FIG. 1 is a top view of the apparatus

Referring to FIG. 1, for the purposes of illustration, the plan view of a water course 10 depicted by a box having a floor 11 with sides 12 and 13 to accommodate the flow of water 14 whose direction is indicated by the arrow. Mounted within the confined water course on shafts 15 and 16 is closed rotatable drum 17 having scraper means 18 with blade 19. The closed drum 17 equipped with scraper means 18 also has sludge removal means 20 connected thereto. The closed cylinder forming drum 17 connected respectively with shafts 15 and 16 and rotatable thereon rests upon and is sustained by sides 12 and 13 of box 10. Shaft 15 is connected through power transfer means 21 with motor drive 22.

Downstream from drum 17 is located drum 23 mounted for rotation on shafts 24 and 25 respectively. The shafts 24 and 25 connected to drum 23 are supported by sides 12 and 13 of box 10. Shaft 25 is connected through power linkage means 26 to motor drive 27. Drum 23 is connected with scraper means 28 having blade 29. The scraper means 28 is also connected with sludge removal means 30. The sludge removal means can include a trough 31 equipped with vacuum line 32 which communicates from the sludge material on the scraper means to the trough 31.

Figure 2:
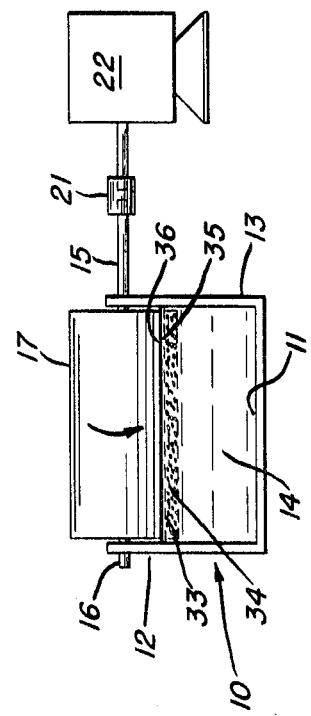
FIG. 2 is an end view in elevation of the apparatus.

FIG. 2 is a sectional view taken along line 2—2 in FIG. 1 with motor drive 22 connecting power transfer means 21 with shafts 15 and 16 which communicate with drum 17. Drum 17 rotates on the axis coinciding with shafts 15 and 16, and drum 17 rotates in the direction of flow. The water course defined generally by box 10 is confined by floor 11 and sides 12 and 13. Water 14 has water level 35, and oil 36. Sludge removal means 20 and scraper means 18 have been removed from this view in order to show the sectional view with the water level and drum location.

In operation, water flows in the direction shown by the arrow in FIG. 1 through the box 10 wherein a weir can be installed upstream from the drums to vary the water level for various purposes of experimentation and development of equipment designed to deal optimally with varying conditions. As the water flows through the box 10 and against drum 17, the drum 17 is rotated on shafts 15 and 16 respectively by motor drive 22 transferring power through power transfer means 21.

The drum 17 is placed at right angles to the direction of water flow and the length of the drum is as close as possible to the width of the confined water course flowing within what has been designated as box 10 of the drawing. Alternately, where the apparatus is installed in streams or other less regularly confined water courses the surface flow can be directed toward the drum by surface baffles or other similarly suitable means. Best results are obtained if the first drum which rotates with the flow to pick up heavy viscous materials is immersed only a small amount, e.g., one-third of its radius or less and its speed of rotation is greater than that of the second drum. The first drum can have a peripheral rate of speed of at least 1 foot per second. The first drum 17 may have a surface of stainless steel, polyethylene, or any other similarly suitable material, preferably a rust resistant organophilic material. These materials forming surfaces for the first drum are effective because the upstream surface of the first drum is descending to meet the contaminant on or near the surface of the flowing water.

As drum 17 rotates in the direction of flow of the water, the surface of the first drum 17 picks up the heavy viscous materials and carries them out of the water for removal by the scraper means 18 having blade 19. Blade 19 can be of Teflon, Viton, or any other similarly suitable material. As the sludge from the surface of the drum is removed by the scraper means 18, the sludge material accumulates on the upper surface of blade 19 or falls into a retaining means where the sludge can be removed by any suitable means such as the sludge removal means 20 which includes a trough 20a and vacuum line 20b communicating with trough 20a and a receptacle not shown. The sludge, if it accumulates on the upper surface of blade 19 can be pulled away from the blade and deposited in the trough 20a through vacuum lines or the contaminant is removed by any means such as gravity, conveyor, or other similarly suitable methods and devices. The trough can be stainless steel or any other similarly suitable material After removal of the heavy, viscous surface contaminant from the water, the water course directs the flowing water containing lighter contaminant material against the surface of rotating drum 23. Drum 23 placed at right angles to the direction of water flow rotates about shafts 24 and 25 in a direction opposing the flow of water. The power of rotation is supplied to drum 23 by motor drive 27 through power transfer means 26.

The second drum 23 rotating in opposition to the flow of water removes the less viscous contaminants from the surface and near the surface of the flowing water. The second drum 23 is immersed in the flowing water to a greater depth than the first drum, the second drum being submerged at least about 0.8 of its radius or more. The rate of rotation of the second drum in a direction opposing the direction of flow of water is relatively slow and is about 0.4 peripheral feet per second. The surface of the second drum 23 is hydrophilic and can be constructed of stainless steel or any other similarly suitable material whose upstream surface rises through the water and satisfactorily picks up a thin water film on which a light contaminant layer is associated as a layer or as a dispersion immediately below the surface. The scraper means 28 and the sludge removal means 30 can be constructed structurally and materially similarly as those associated with the first drum 17.

The following examples appear as mere illustrations of the operation of the novel method and apparatus of this invention to portray the operativeness of the structure recited without limitation upon the scope of the novelty residing therein. The examples are presented to portray the effect of variation of such factors as the direction of drum rotation, the speed of drum rotation, the depth of drum immersion, the type of contaminant, etc.

EXAMPLE I

A closed rotating drum mounted for rotation about its longitudinal axis, the axis at right angles to the flow of contaminated water, was located in a long narrow stainless steel water course. The drum was about 3 inches in diameter and about 4 inches in width, the trough was about 6 feet long and about 4 inches wide, having a depth of about 3 inches. The scraper means utilized included those made from Teflon and Viton. A small suction funnel or trough essentially the width of the scraper means and located below the scraper means catches the sludge falling from the blade for removal of the sludge from the system.

An electric motor drive means transmitting power through a variable speed linkage to shaft 15 allowed the rotation of the drum at selected varying speeds. Rotation of the drum may be reversed so that the direction of rotation may be either with or against the direction of flow of the water within the confined water course. The speed of drum rotation is indicated in the tables in both r.p.m. and peripheral feet per second. Depth of immersion of the drum is given in inches and as a fraction of the drum radius. Depth of immersion is controlled by varying the water level with a weir at the upstream end of the water course.

Water flowed through the trough at such a rate that the surface or linear velocity was approximately 3 inches per second. The temperature of the water was varied by mixing hot and cold water streams a sufficient distance upstream from the rotating drum to allow thorough mixing during flow to the drum. The contaminant was released from a burette on to the flowing water surface at a point about 4 feet upstream from the drum. Contaminants including oil, sludge, etc., removed by the drum were collected in a flask connected to the scraper means and contaminant removal means. Contaminant materials introduced from the upstream burette included surface emulsion removed from the third compartment of the bioaeration pond, low-viscosity crude oil mixtures, low-viscosity slop oil from separators, and viscous presettler material from the first compartment of bioponds.

Table I below depicts data obtained from drum rotation against flow at low speeds with deep immersion with 10 cc. of mixed crude.

The direction of rotation of the drum was against flow at the time the data portrayed in Table I was collected.

TABLE I.—REMOVAL OF CRUDE OIL MIXTURES

| Drum speed, r.p.m. | Drum depth, in. | Removal time, min. | Water removed, cc. |
|---|---|---|---|
| 120 | 0.5 | 15 | 7,900 |
| 80 | 0.5 | 10 | 1,425 |
| 40 | 0.5 | 35 | 220 |
| 120 | 1.0 | 18 | 7,650 |
| 80 | 1.0 | 12 | 2,350 |
| 40 | 1.0 | 18 | 625 |
| 120 | 1.25 | 30 | 14,000 |
| 80 | 1.25 | 12 | 3,650 |
| 40 | 1.25 | 10 | 500 |

EXAMPLE II

The apparatus and methods are essentially similar to those defined in example I and the following data were observed. The direction of rotation of the drum was against the flow of water.

TABLE II.—REMOVAL OF SLOP OIL

| Drum speed, r.p.m. | Drum depth, in. | Removal time, min. | Water removed, cc. |
|---|---|---|---|
| 120 | 0.5 | 10 | 6,000 |
| 80 | 0.5 | 6 | 625 |
| 40 | 0.5 | 30 | 25 |
| 120 | 1.0 | 11 | 5,400 |
| 80 | 1.0 | 7 | 1,500 |
| 40 | 1.0 | 18 | 140 |
| 120 | 1.25 | 14 | 6,000 |
| 80 | 1.25 | 8 | 500 |
| 40 | 1.25 | 10 | 125 |

EXAMPLE III

The apparatus and methods are essentially similar to those defined in example I and the following data were observed. The rotation of the drum was with the flow of water.

TABLE III.—REMOVAL OF PRE-SETTLER OIL

| Drum speed, r.p.m. | Drum depth, in. | Removal time, sec. | Water removed, cc. |
|---|---|---|---|
| 120 | 0.5 | 15 | 150 |
| 80 | 0.5 | 20 | 150 |
| 40 | 0.5 | 40 | 10 |
| 120 | 1.0 | 20 | 325 |
| 80 | 1.0 | 25 | 90 |
| 40 | 1.0 | 50 | 10 |
| 120 | 1.25 | 45 | 450 |
| 80 | 1.25 | 45 | 150 |
| 40 | 1.25 | 90 | 50 |

EXAMPLE IV

The apparatus and methods are essentially similar to those defined in example I and the following data were observed. The rotation of the drum was against the flow of water, the water having a temperature of about 70° F. and a Viton scraper was utilized.

TABLE IV.—REMOVAL OF CRUDE OIL MIXTURES

| Drum speed, r.p.m. | Drum depth, in. | Removal time, min. | Water removed, cc. |
|---|---|---|---|
| 55 | 0.5 | 11 | 380 |
| 28 | 0.5 | 8 | 110 |
| 55 | 1.0 | 6 | 450 |
| 28 | 1.0 | 5 | 130 |
| 55 | 1.25 | 18 | 1,000 |
| 28 | 1.25 | 4,4,3,3* | 200, 150, 150, 120* |

*Duplicate determinations (at optimum conditions).

EXAMPLE V

The apparatus and methods are essentially similar to those defined in example I and the following data were observed. The rotation of the drum was against flow. The water temperature was about 70° F. A Viton scraper was utilized.

TABLE V.—REMOVAL OF CRUDE OIL MIXTURES

| Drum speed, r.p.m. | Drum depth, in. | Removal time, min. | Water removed, cc. |
|---|---|---|---|
| 28 | 0.5 | 10 | 30 |
| 11 | 0.5 | ¹10 | 10 |
| 6 | 0.5 | ¹16 | 5 |
| 28 | 1.0 | 7 | 100 |
| 11 | 1.0 | ¹10 | 60 |
| 6 | 1.0 | ¹18 | 10 |
| 28 | 1.25 | 4 | 120 |
| 11 | 1.25 | ¹14 | 80 |
| 6 | 1.25 | ¹25 | 25 |

¹ Leakage.

EXAMPLE VI

The apparatus and methods are essentially similar to those defined in example I and the following data were observed. The drum rotation was against flow. The water temperatures were about 70° F. and about 100° F. A Viton scraper was utilized.

TABLE VI.—REMOVAL OF CRUDE OIL MIXTURES

| Drum speed, r.p.m. | Drum depth, in. | Removal time, min. | | Water removed, cc. | |
|---|---|---|---|---|---|
| | | 70° F. | 100° F. | 70° F. | 100° F. |
| 55 | 0.5 | 40 | 30 | 800 | 250 |
| 28 | 0.5 | 5 | ¹7 | 20 | 10 |
| 11 | 0.5 | 7 | ¹12 | 10 | 5 |
| 55 | 1.0 | 5 | 20 | 350 | 250 |
| 28 | 1.0 | 4 | ¹8 | 100 | 15 |
| 11 | 1.0 | 11 | ¹16 | 20 | 10 |
| 55 | 1.25 | 4 | 18 | 440 | 500 |
| 28 | 1.25 | 3 | ¹11 | 100 | 20 |
| 11 | 1.25 | 14 | ¹18 | 35 | 5 |

¹ Leakage.

EXAMPLE VII

The apparatus and methods are essentially similar to those defined in example I and the following data were observed. The rotation of the drum was against flow. The water temperature was about 70° F. A Viton scraper was utilized.

TABLE VII.—REMOVAL OF CRUDE OIL MIXTURES

| Drum speed, r.p.m. | Drum depth, in. | Removal time, min. | Water removed, cc. |
|---|---|---|---|
| 55 | 0.5 | 12 | 390 |
| 28 | 0.5 | 5 | 50 |
| 19 | 0.5 | 7 | 30 |
| 14 | 0.5 | 8 | 10 |
| 55 | 1.0 | 6 | 500 |
| 28 | 1.0 | 4 | 80 |
| 19 | 1.0 | 6 | 60 |
| 14 | 1.0 | 9 | 25 |
| 55 | 1.25 | 5 | 450 |
| 28 | 1.25 | 4 | 110 |
| 19 | 1.25 | 5 | 80 |
| 14 | 1.29 | 7 | 70 |

EXAMPLE VIII

The apparatus and methods are essentially similar to those defined in example I and the following data were observed. The drum rotation was against flow. The water temperature was about 100° F. A Viton scraper was utilized.

TABLE VIII.—REMOVAL OF CRUDE OIL MIXTURES

| Drum speed, r.p.m. | Drum depth, in. | Removal time, min. | Water removed, cc. |
|---|---|---|---|
| 55 | 0.5 | 7 | 300 |
| 28 | 0.5 | 5 | 40 |
| 19 | 0.5 | 6 | 40 |
| 14 | 0.5 | 7 | 20 |
| 55 | 1.0 | 8 | 380 |
| 28 | 1.0 | 4 | 50 |
| 19 | 1.0 | 8 | 30 |
| 14 | 1.0 | 9 | 40 |
| 55 | 1.25 | 4 | 230 |
| 28 | 1.25 | 4 | 70 |
| 19 | 1.25 | 11 | 90 |

EXAMPLE IX

The apparatus and methods are essentially similar to those defined in example I and the following data were observed. The rotation of the drum was against flow. The temperature of the water was about 70° F. A Viton scraper was utilized. The film was compressed with a Teflon barrier located about 2 inches upstream from the rotating drum.

TABLE IX.—REMOVAL OF CRUDE OIL MIXTURE

| Drum speed, r.p.m. | Drum depth, in. | Removal time, min. | | Water removed, cc. | |
|---|---|---|---|---|---|
| | | Without barrier | With barrier | Without barrier | With barrier |
| 55 | 0.5 | 40 | ¹70 | 800 | 2,000 |
| 28 | 0.5 | 5 | ¹10 | 20 | 110 |
| 55 | 1.0 | 5 | 18 | 350 | 1,000 |
| 28 | 1.0 | 4 | 7 | 100 | 150 |
| 55 | 1.25 | 4 | 52 | 440 | 2,600 |
| 28 | 1.25 | 3 | 6 | 100 | 160 |

¹ Leakage.

EXAMPLE X

The apparatus and methods are essentially similar to those defined in example I and the following data were observed. The rotation of the drum was against flow. The water temperatures were about 70° F. and about 100° F. A Viton scraper was utilized.

TABLE X.—REMOVAL OF BIO-POND SURFACE EMULSION

| Drum speed, r.p.m. | Drum depth, in. | Removal time, min. | | Water removed, cc. | |
|---|---|---|---|---|---|
| | | 70° F. | 100° F. | 70° F. | 100° F. |
| 55 | 0.5 | 2 | 7 | 160 | 600 |
| 28 | 0.5 | 1 | 7 | 30 | 150 |
| 11 | 0.5 | 5 | 12 | 10 | 20 |
| 55 | 1.0 | 2 | 6 | 200 | 480 |
| 28 | 1.0 | 1 | 9 | 25 | 250 |
| 11 | 1.0 | 7 | 12 | 20 | 20 |
| 55 | 1.25 | 4 | 9 | 450 | 750 |
| 28 | 1.25 | 8 | 12 | 400 | 250 |
| 11 | 1.25 | 12 | 18 | 110 | 25 |

EXAMPLE XI

The apparatus and methods are essentially similar to those defined in example I and the following data were observed. The drum rotation was against flow. The water temperature was about 70° F. A Viton scraper was utilized. The film was compressed with a Teflon barrier located about 2 inches upstream from the rotating drum.

TABLE XI.—REMOVAL OF BIO-POND SURFACE EMULSION

| Drum speed, r.p.m. | Drum depth, in. | Removal time, min. | | Water removed, cc. | |
|---|---|---|---|---|---|
| | | Without barrier | With barrier | Without barrier | With barrier |
| 55 | 0.5 | 2 | 10 | 160 | 1,000 |
| 28 | 0.5 | 1 | 11 | 30 | 370 |
| 11 | 0.5 | 5 | 11 | 10 | 100 |
| 55 | 1.0 | 2 | 15 | 200 | 1,500 |
| 28 | 1.0 | 1 | 12 | 25 | 400 |
| 11 | 1.0 | 7 | 8 | 20 | 70 |
| 55 | 1.25 | 4 | 9 | 450 | 950 |
| 28 | 1.25 | 8 | 10 | 400 | 450 |
| 11 | 1.25 | 12 | 13 | 110 | 110 |

EXAMPLE XII

The apparatus and methods are essentially similar to those defined in example I and the following data were observed. The drum rotation was against flow. The water temperature was about 100° F. A Viton scraper was utilized. The film was compressed with a Teflon barrier located about 2 inches upstream from the rotating drum.

TABLE XII.—REMOVAL OF BIO-POND SURFACE EMULSION

| Drum speed, r.p.m. | Drum depth, in. | Removal time, min. | | Water removed, cc. | |
|---|---|---|---|---|---|
| | | Without barrier | With barrier | Without barrier | With barrier |
| 55 | 0.5 | 7 | 8 | 600 | 590 |
| 28 | 0.5 | 7 | 12 | 150 | 220 |
| 11 | 0.5 | 12 | 9 | 20 | 20 |
| 55 | 1.0 | 6 | 14 | 480 | 1,030 |
| 28 | 1.0 | 9 | 15 | 250 | 350 |
| 11 | 1.0 | 12 | 16 | 20 | 35 |
| 55 | 1.25 | 9 | 14 | 750 | 1,250 |

The instant novel apparatus and method includes two or more rotating drums in series for removing and separating what is generally characterized as surface and bulk contaminants in effluent waste water streams. In this multidrum system a first drum rotates in the direction of water flow and removes the heavy viscous contaminant materials. A second drum rotates in opposition to the water flow and removes the light less viscous contaminant components. Consequently, a surprising and superior result resides in not only removing two or more types of contaminant materials by drums in series rotating in different directions, but surprising and superior results also reside in the sequential separation of heavy and light components.

Briefly, the novel method of this invention includes in combination the steps of, flowing a water containing essentially surface contaminants against a closed organophilic drum surface rotating in the direction of water flow, attracting the heavy viscous substantially organic contaminants to the surface of the drum, separating said contaminants from the water, and removing the contaminants from the drum system. The method may be carried out under conditions of varying temperatures, speeds, water levels, and amount of contaminants. Additional dispersed oil 34 below the water level 33 and above the bottom of the submerged part of the drum will be picked up by the rotating drum as well as the oil 36 located above the oil-water interface 35.

The novel apparatus and method provide a surprising and superior rate at which the heavy viscous contaminant material is picked up quantitatively by a first drum rotating with the flow of water. The novel method and apparatus of this invention provides a system wherein the sequentially separated contaminants may be used for different purposes such as, the heavy viscous materials picked up by a first rotating drum may be burned for the heat value or used in the of roads, etc., whereas the lighter less viscous contaminants removed by a subsequent drum may be returned to crude for re-refining. The novel apparatus and method of this invention may be combined with a wide variety of flocculation and flotation procedures for the removal and separation of various contaminants and by varying the speeds of rotation, the depths of immersion, the drum-surface compositions, the number of treatments in series, etc., further fractionation of the contaminants may be achieved at a minimum of cost.

This invention is described by reference to the specific embodiments defined and claimed herein; however, it is understood that the embodiments are not intended to limit the scope of the invention, but these embodiments are presented only to teach the best modes contemplated for practicing this invention.

We claim

1. A method for removing heavy and light oily contaminants from water flowing in a predetermined direction, comprising the steps of:
    a. first contacting the water with a first revolving member which is partially submerged in said flowing water, said first member having a polyethylene surface which moves generally in the same direction as the flowing water when said first member contacts said water, whereby heavy, viscous oils adhere to said polyethylene surface and are withdrawn from the flowing water as the first member revolves;
    b. subsequently contacting the water with a second revolving member partially submerged in said water, said second member having a steel surface which moves generally opposite to the direction of flow of water when said second member contacts said water, whereby light oils adhere to said steel surface and are withdrawn from the water as the second member revolves; and
    c. removing oils adhering to said surfaces when said surfaces are withdrawn from the water.

2. The method defined in claim 1 wherein the polyethylene surface moves through the water at a rate of from about 0.5 to about 2 feet per second, and the steel surface moves through the water at a rate of from about 0.1 to about 1 foot per second.

3. The method defined in claim 2 wherein the polyethylene surface is organophilic and the steel surface is hydrophilic.

4. Apparatus for removing oil from the surface of water, comprising:
    support means above the water's surface;
    first drum means mounted on said support means to rotate about its longitudinal axis and having a polyethylene surface which is partially submerged in the water;
    second drum means spaced from said first drum means and mounted on said support means to rotate about its longitudinal axis and having a steel surface which is partially submerged in the water;
    first drive means for rotating said first drum means in a first rotational direction;
    second drive means for rotating the second drum means in a second rotational direction opposite to the rotational direction of the first drum means; and
    means in contact with said first and second drum means for removing any oil adhering to surfaces.